United States Patent
Chen

(10) Patent No.: US 7,325,241 B2
(45) Date of Patent: Jan. 29, 2008

(54) OPTICAL DISK DRIVE WITH ANTI-TILT TRAY MECHANISM

(75) Inventor: Chen-Jung Chen, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 415 days.

(21) Appl. No.: 11/059,527

(22) Filed: Feb. 17, 2005

(65) Prior Publication Data

US 2005/0198653 A1    Sep. 8, 2005

(30) Foreign Application Priority Data

Mar. 3, 2004   (TW) .............................. 93105488 A

(51) Int. Cl.
*G11B 33/02* (2006.01)
(52) U.S. Cl. ..................................... 720/601
(58) Field of Classification Search ............... 720/613, 720/601
See application file for complete search history.

(56) References Cited

U.S. PATENT DOCUMENTS 6,910,218 B2 *   6/2005   Park et al. ................... 720/653
7,020,884 B2 *   3/2006   Choi et al. ................... 720/613
7,103,893 B2 *   9/2006   Kimura et al. ............... 720/613
7,140,029 B2 *  11/2006   Chiou et al. ................. 720/613

FOREIGN PATENT DOCUMENTS

JP    2001-216703 A    8/2001

* cited by examiner

*Primary Examiner*—William Korzuch
*Assistant Examiner*—Mark Blouin
(74) *Attorney, Agent, or Firm*—Birch, Stewart, Kolasch & Birch, LLP

(57) ABSTRACT

An optical disk drive with an anti-tilt tray. The optical disk drive has a top protrusion, a fulcrum and a tray disposed on the main body of the optical disk drive along a track constrained by the top protrusion and the fulcrum. The tray is movable between a first position and a second position. Each track of the tray has a gradually thickened area. When the tray is in the second position, the top protrusion and the fulcrum contact the gradually thickened area, such that the gap between the track and the top protrusion is reduced, preventing the tray from vertical tilting.

5 Claims, 7 Drawing Sheets

OPTICAL DISK DRIVE WITH ANTI-TILT TRAY MECHANISM

BACKGROUND OF THE INVENTION

1. Field of the Invention

The invention relates to a short optical disk drive, and in particular to a short optical disk drive with a vertical anti-tilt tray.

2. Brief Discussion of the Related Art

FIG. 1A is a perspective view of a conventional optical disk drive. In FIG. 1A, the conventional optical disk drive 10 has a main body 11 and a tray 12. The tray 12 has a recess 13 receiving optical discs. The main body 11 of the optical disk drive 10 has a carrier 14 and a driving module 17. A spindle motor 15 and a pickup head 16 are disposed on the carrier 14. After the driving module 17 moves the tray 12 holding an optical disc into the main body 11 and lifts the carrier 14, the spindle motor 15 rotates the optical disc, and data is read therefrom or written thereto by the. pickup head 16.

FIG. 1B shows a conventional optical disk drive with the tray ejected. In FIG. 1B, the main body 11 of the optical disk drive comprises two fulcrums 18 and top protrusions 19 in the front on either side, guiding the tray 12 along track 121. The main body 11 and tray 12 of the conventional optical disk drive comprises a length requiring that a large portion of the tray 12 remain in the main body 11 when the tray 12 is open. The top protrusions 19 can be disposed internally, such that the horizontal distance d between each top protrusion 19 and fulcrum 18 is longer, preventing obvious vertical tilt when the tray 12 is ejected.

Currently, optical disk drives are shortened to reduce required space in device housings. FIG. 2A shows a conventional short optical disk drive. Because the main body 21 and the tray 22 of the conventional short optical disk drive 20 are shortened, only a short portion of the tray 22 remains in the main body 21 when the tray 22 is open. The top protrusions 29 are close to the front edge of the main body 21, providing sufficient support for the tray 22. The horizontal distance d' between each top protrusion 29 and fulcrum 28, however, is shortened as shown in FIG. 2B, such that the ratio of the first horizontal distance d' between the top protrusion 29 and the fulcrum 28 to the second horizontal distance D between the fulcrum 28 and a front end of the tray 22 is larger than that in the conventional long optical disk drive 10 in FIG. 1A. Thus, gaps between the tray 22 and the top protrusions 29 are increased, causing the tray 22 to tilt seriously downward as shown by arrow p in FIG. 2B, with increased jitter and noise when closing the tray 22.

SUMMARY OF THE INVENTION

Accordingly, an embodiment of the invention provides an optical disk drive with an improved tray structure, reducing vertical tilt thereof and noise when the tray closes.

An embodiment of the invention provides an optical disk drive having an anti-tilt tray. The optical disk drive comprises a top protrusion, a fulcrum and a tray. The tray is disposed on the main body of the optical disk drive along tracks constrained by the top protrusion and the fulcrum. The tray is movable between a first position and a second position. Each track of the tray has a gradually thickened area. When the tray is in the second position, one of the top protrusion and the fulcrum are pressed in the gradually thickened area. Once the fulcrum touches the thickened area, the gap can be reduced. For the same reason, while one of the top protrusion contacts the thickened area, the gap can also be reduced. Altogether, the gap between the track and the top protrusion is reduced, preventing vertical tilting.

The tray is received in the optical disk drive when in the first position, and opened when the tray is in the second position.

In addition, when the tray is in the second position, the ratio of a first horizontal distance between the fulcrum and a front end of the tray to a second horizontal distance between the top protrusion and the fulcrum is between 8 and 15. The thickened area thickens gradually from 0.05 mm to 0.5 mm.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE PREFERRED EMBODIMENTS

Figure 3A:
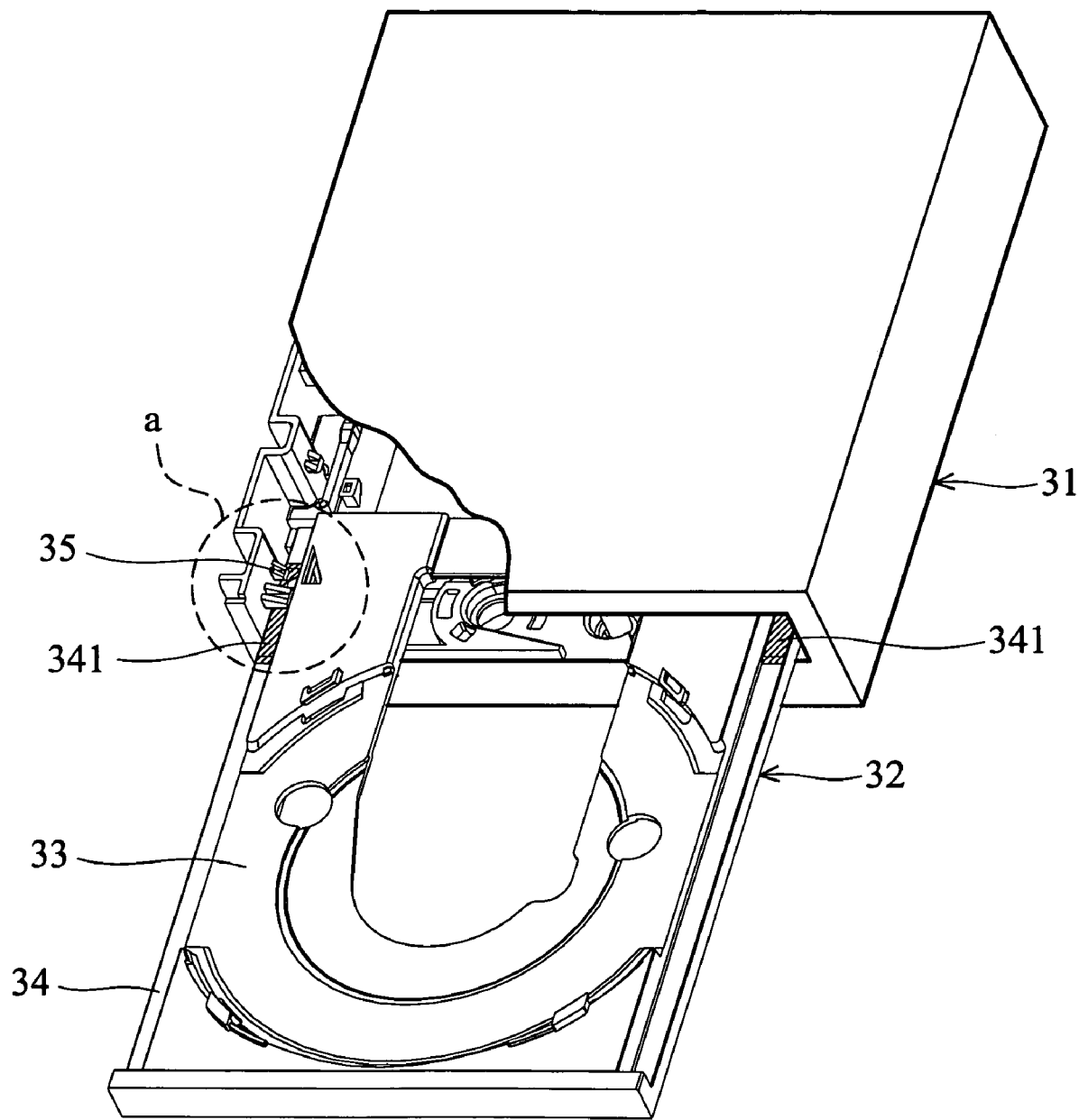
FIG. 3A is a perspective view of the short optical disk drive of an embodiment of the invention when the tray is open.

FIG. 3A shows the short optical disk drive of an embodiment of the invention with the tray ejected. For clarity, part of the housing 31 of the optical disk drive 30 is partially cut away to show the inner structure of the main body 31 and the tray 32.

Figure 1A:
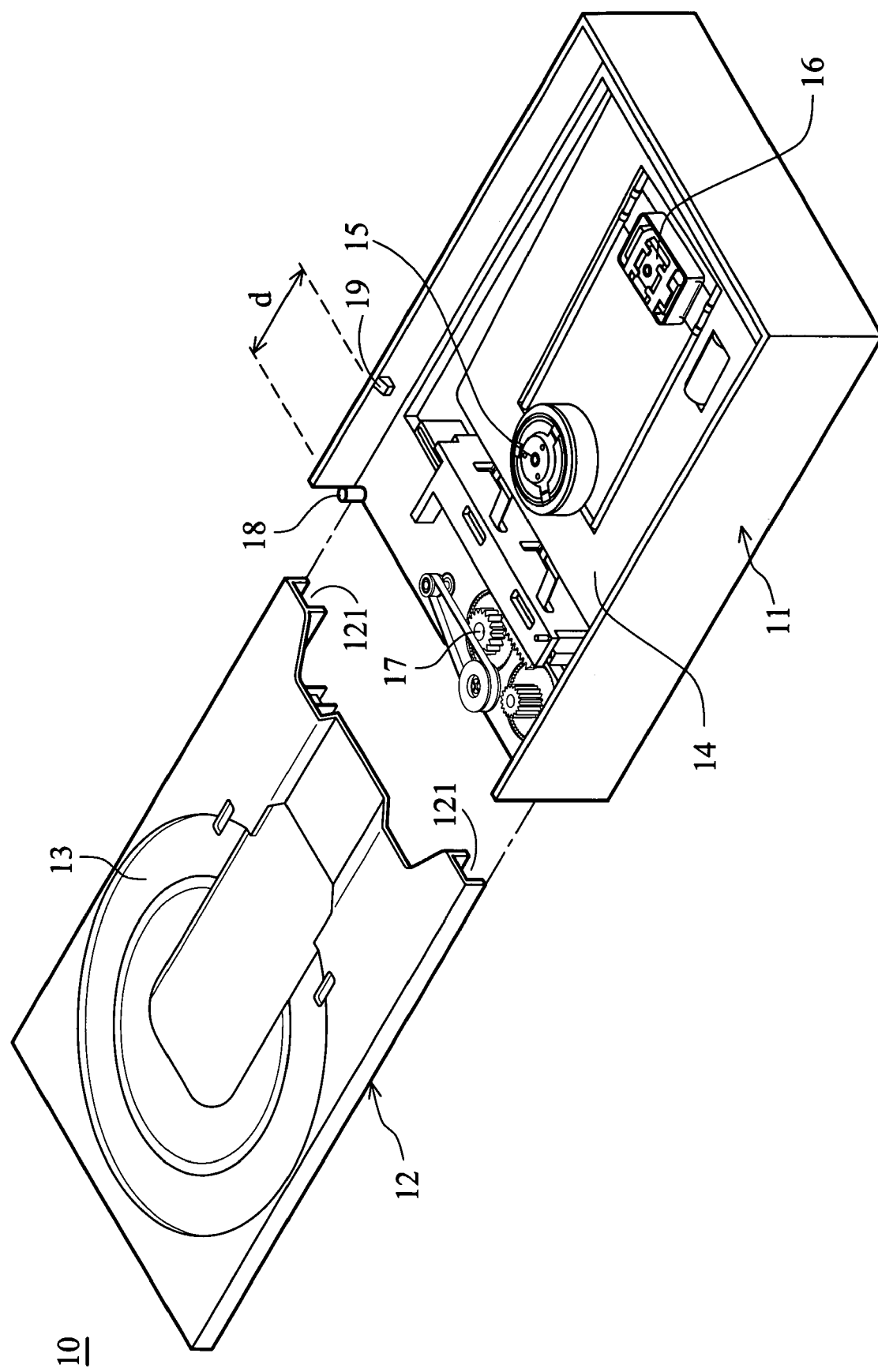
FIG. 1A is a perspective view of a conventional optical disk drive.
Figure 1B:
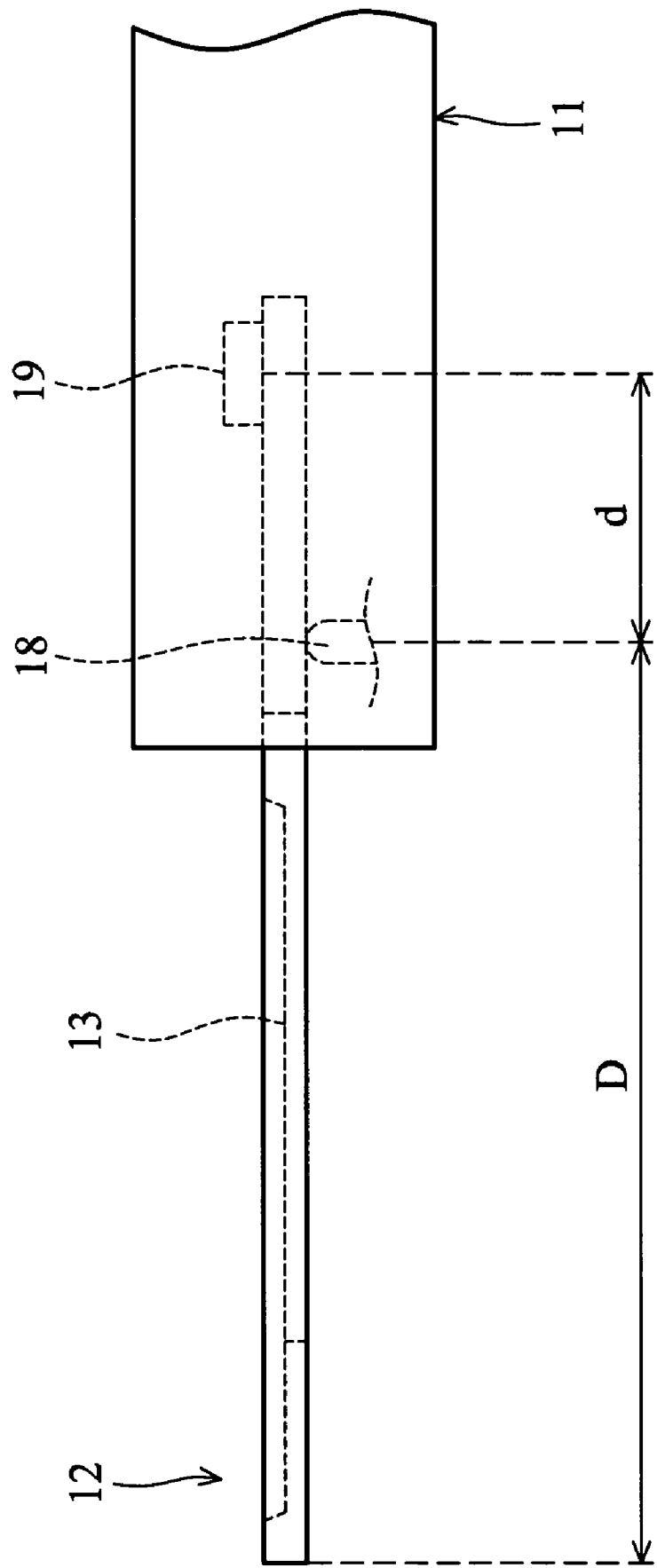
FIG. 1B is a schematic view of a conventional optical disk drive when the tray is open.
Figure 2A:
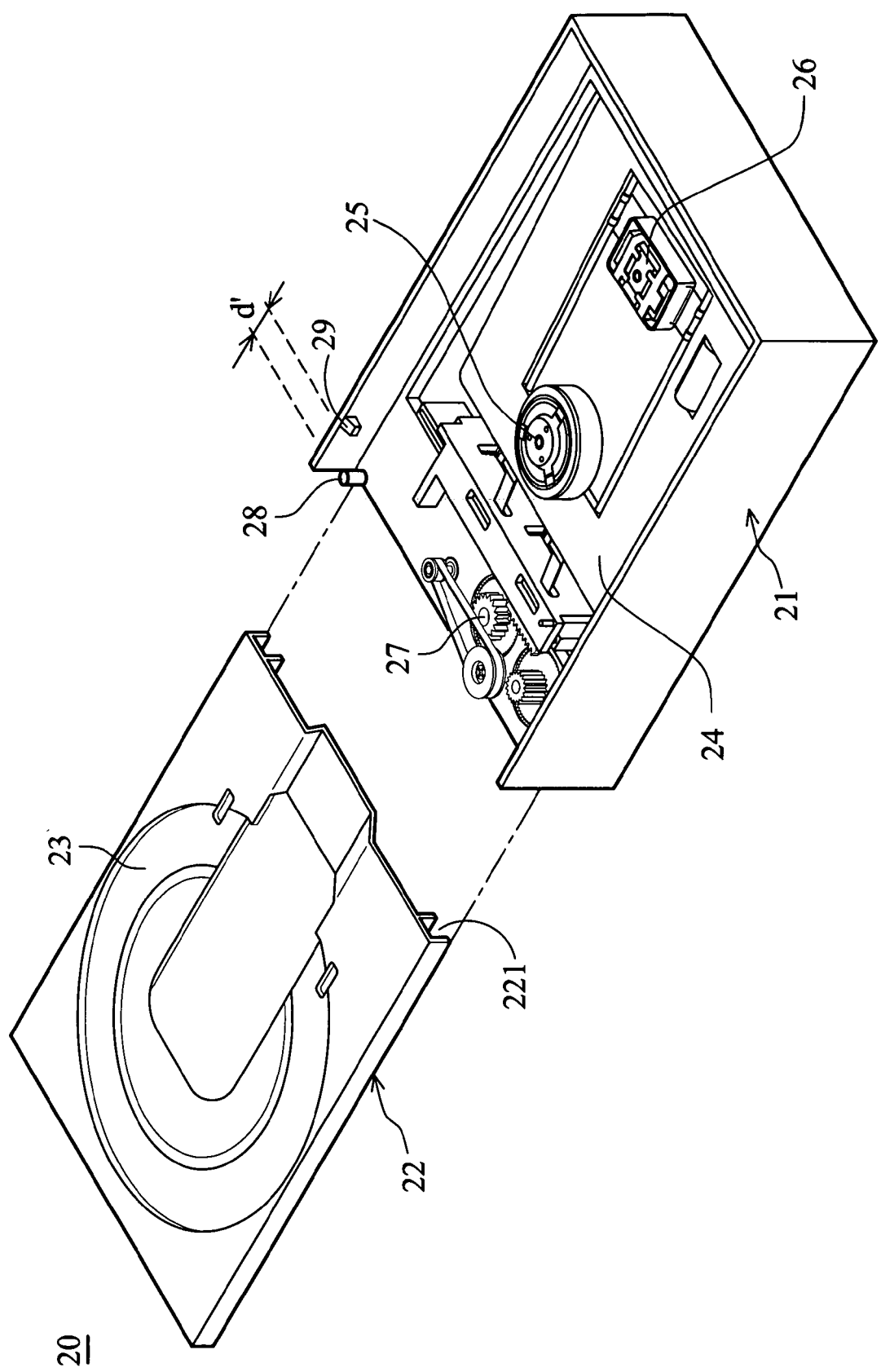
FIG. 2A is a perspective view of a conventional short optical disk drive.
Figure 2B:
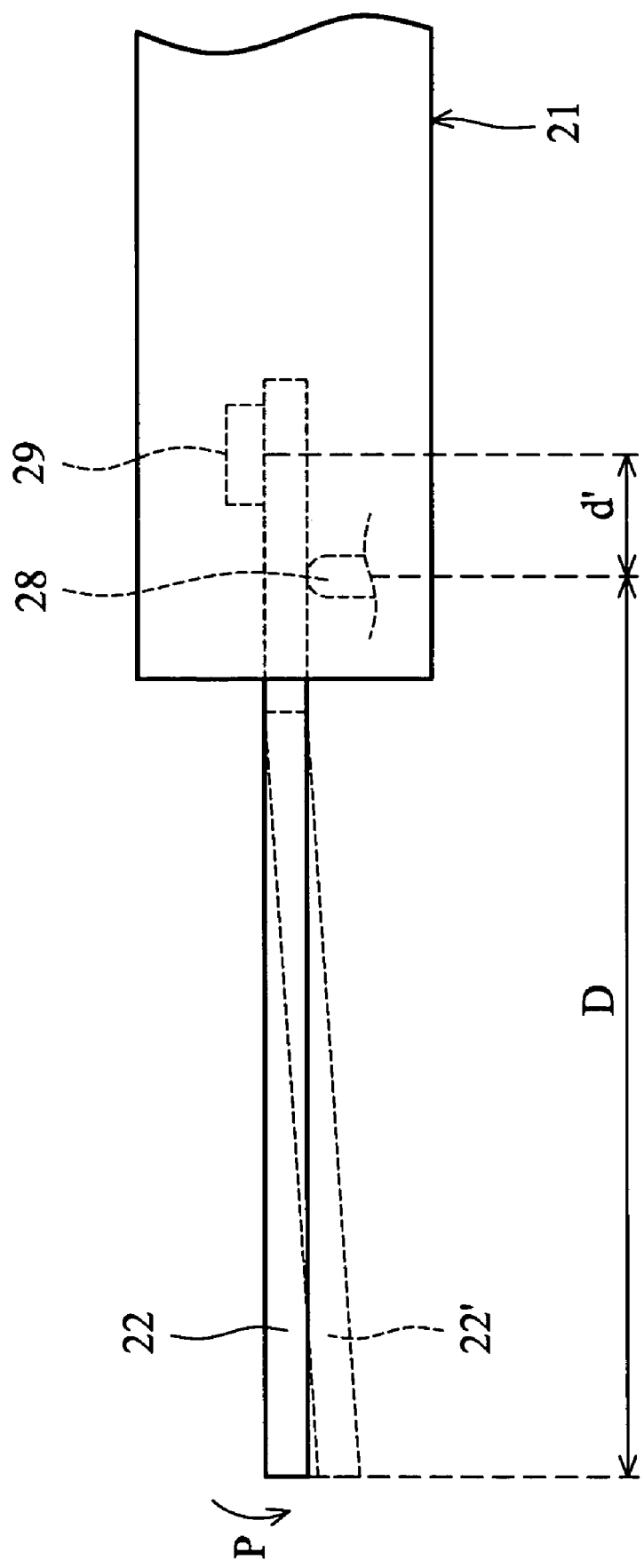
FIG. 2B is a schematic view of the conventional short optical disk drive when the tray is open.

In FIG. 3A, the optical disk drive 30 comprises a main body 31 and a tray 32. In addition, the optical disk drive 30 also comprises the spindle motor, pickup head, and driving module as shown in FIG. 2A. The main body 31 has two top protrusions 35 and fulcrums 38 (in FIG. 4A) on either side at the front thereof. The tray 32 has two tracks 34 on either side guided between the top protrusions 35 and fulcrums, movable between a first position and a second position. The tray 32 is received in the main body 31 when in the first position, and open when in the second position. The circular recess 33 is to receive an optical disk.

Figure 3B:
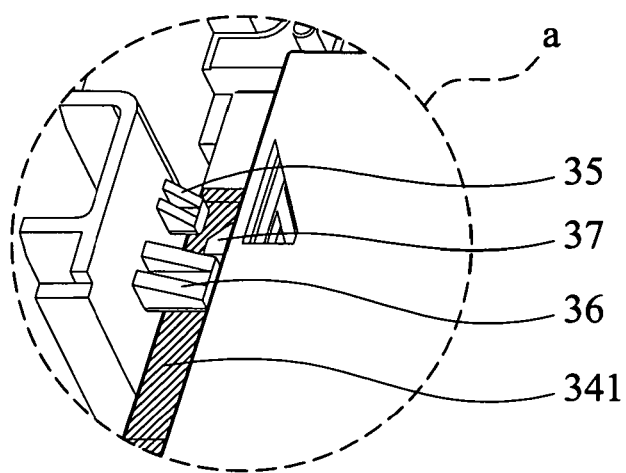
FIG. 3B is an enlarged view of area a in FIG. 3A.

FIG. 3B is an enlarged view of the area a of FIG. 3A. In FIGS. 3A and 3B, the tray 32 has elastic elements 37 on the sidewall near the rear portion. The main body 31 has a stopper 36 near the top protrusions 35 to block the elastic elements 37 when the tray 32 is open, preventing the tray 32 from departing from the main body 31 of the optical disk drive 30.

Figure 3C:
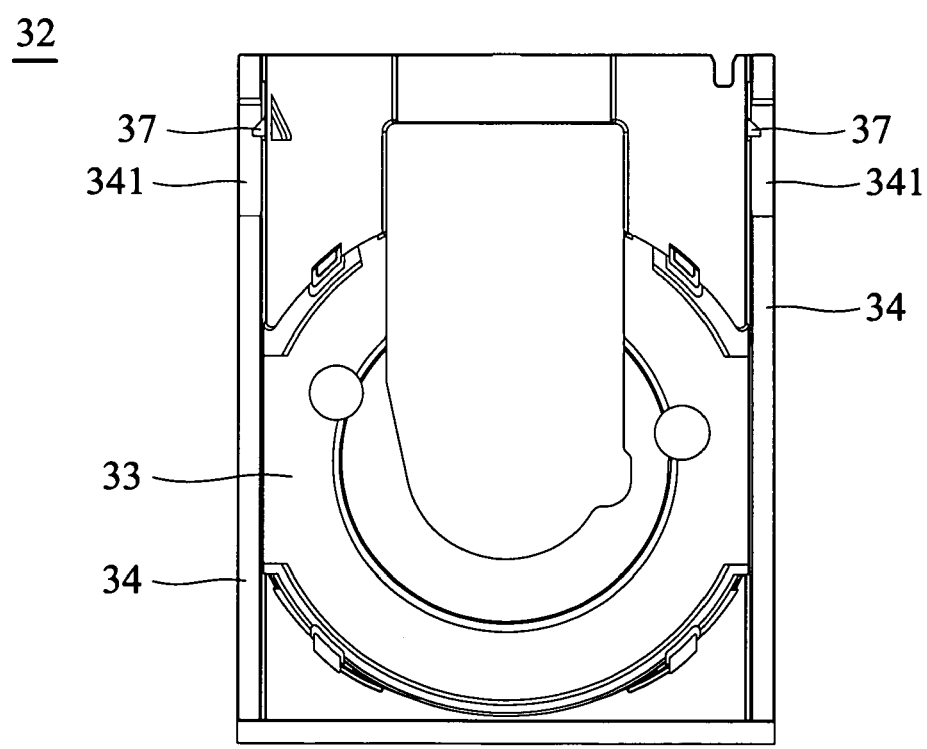
FIG. 3C is a top view of the tray of FIG. 3A.

FIG. 3C is a top view of the tray of FIG. 3A. In FIGS. 3A-3C, the tracks 34 of the tray 32 have a thickened area 341 respectively at the middle-rear portion thereof. The track 34 within the thickened areas 341 is thicker than the other portion thereof, such that the top protrusions 35 and the fulcrums enter the thick areas 341 when the tray 32 is open. The reduced gaps between the top protrusions 35 and the tracks 34 of the tray 32 prevent tilting for the short optical disk drive 30 of the invention.

Figure 4A:
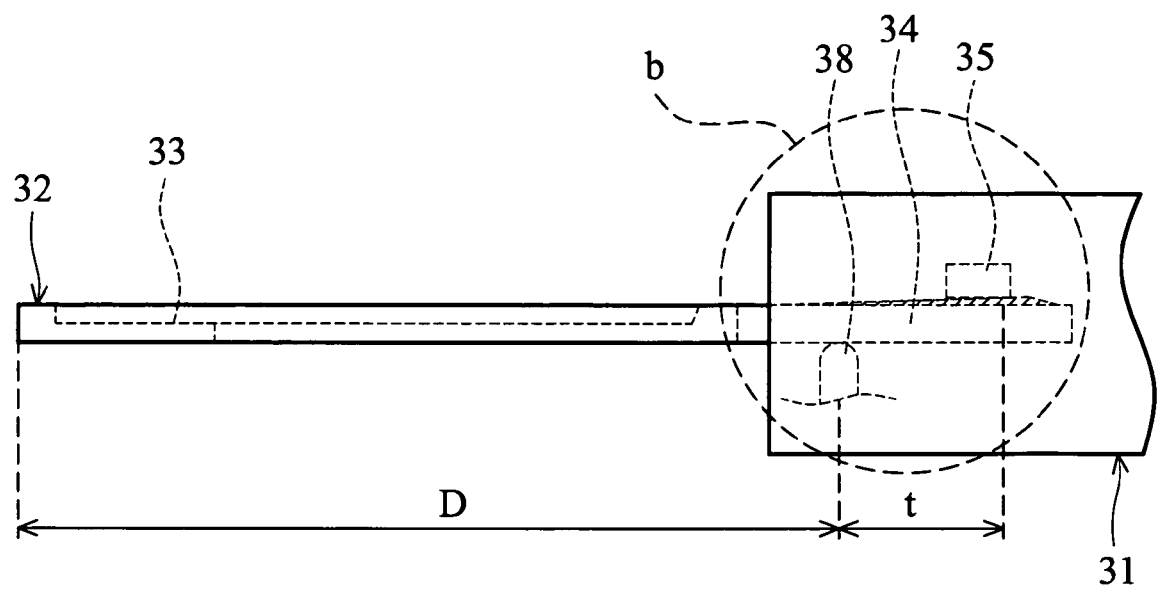
FIG. 4A is a schematic side view of the short optical disk drive when the tray is open.
Figure 4B:
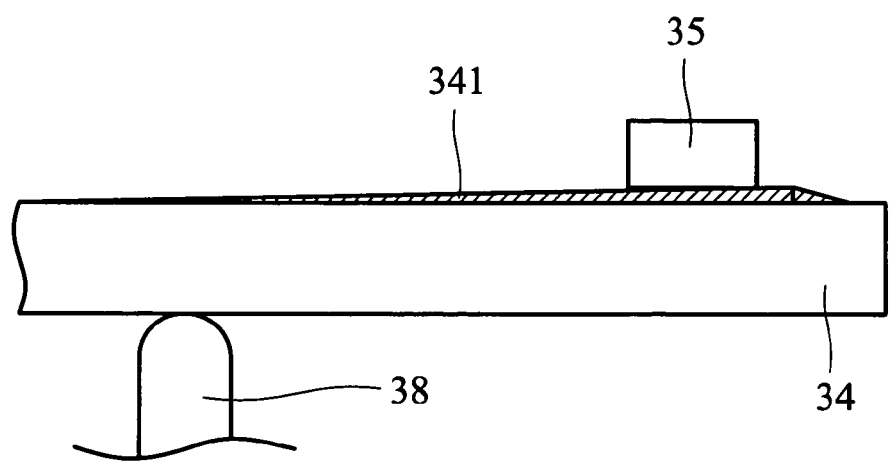
FIG. 4B is an enlarged view of area b of FIG. 4A.

FIG. 4A is a schematic side view of the short optical disk drive when the tray 32 is open, and FIG. 4B is an enlarged view of area a. In FIGS. 3A and 4A-4B, the main body 31 of the optical disk drive has two top protrusions 35 and fulcrums 38, guiding the tracks 34 of the tray 32 therebetween horizontally. When the tray 32 is opened to the second position, the top protrusions 35 and the fulcrums 38 contact the thickened areas 341 of the track 34, such that gaps between the top protrusions 35 and the tracks 34 of the tray 32 are reduced.

Preferably, the length of the short optical disk drive of the invention is 170 mm, and the length of the tray 32 is 165 mm. The tray 32 must be extended from the main body 31 for 140 mm to receive CDs of diameter 120 mm. The horizontal distance between each pair of top protrusions 35 and fulcrums 38 is between 8 and 20 mm, whereby the ratio of a first horizontal distance D between the fulcrum 38 and the front end of the tray 32 to a second horizontal distance t between the top protrusion 35 and the fulcrum 38 is between 8 and 15 when the tray 32 is in the second position.

In FIG. 4B, areas 341 are gradually increased from 0.05 mm to 0.5 mm. Thus, the gap between each track 34 and top protrusion 35 is gradually reduced during tray 32 is moving back toward the optical disk drive, reducing jitter and noise.

While the invention has been described by way of example and in terms of the preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
   a main body with a top protrusion and a fulcrum;
   a tray disposed on the main body along tracks constrained by the top protrusion and the fulcrum and movable between a first position and a second position, wherein each track has a gradually thickened area, and one of the top protrusion and the fulcrum contact the thickened area when the tray is in the second position.

2. The optical disk drive as claimed in claim 1, wherein the tray is received in the main body when the tray is in the first position.

3. The optical disk drive as claimed in claim 1, wherein the tray is open when the tray is in the second position.

4. The optical disk drive as claimed in claim 1, wherein when the tray is in the second position, the ratio of a first horizontal distance between the fulcrum and a front end of the tray to a second horizontal distance between the top protrusion and the fulcrum is between 8 and 15.

5. The optical disk drive as claimed in claim 1, wherein the thickened area thickens front 0.05 mm to 0.5 mm.

* * * * *